(12) United States Patent
Yang et al.

(10) Patent No.: US 12,335,516 B2
(45) Date of Patent: Jun. 17, 2025

(54) VIDEO ENCODER AND OPERATING METHOD OF THE VIDEO ENCODER

(71) Applicant: Samsung Electronics Co., Ltd., Suwon-si (KR)

(72) Inventors: Jungyeop Yang, Seoul (KR); Sungho Jun, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/743,962

(22) Filed: May 13, 2022

(65) Prior Publication Data

US 2022/0377369 A1 Nov. 24, 2022

(30) Foreign Application Priority Data

May 21, 2021 (KR) ........................ 10-2021-0065708

(51) Int. Cl.
*H04N 11/02* (2006.01)
*H04N 19/176* (2014.01)
*H04N 19/513* (2014.01)
*H04N 19/56* (2014.01)

(52) U.S. Cl.
CPC ........... *H04N 19/56* (2014.11); *H04N 19/176* (2014.11); *H04N 19/521* (2014.11)

(58) Field of Classification Search
CPC .................................................... H04N 19/56
USPC ........................................ 375/240.01–240.29
See application file for complete search history.

(56) References Cited

U.S. PATENT DOCUMENTS

| 7,362,808 | B2 | 4/2008 | Kang |
| 7,433,407 | B2 | 10/2008 | Lee et al. |
| 10,841,794 | B2 | 11/2020 | Liu et al. |
| 10,856,006 | B2 | 12/2020 | Esenlik et al. |
| 2003/0142869 | A1* | 7/2003 | Blaettermann ........ H04N 19/34 375/E7.092 |
| 2006/0285590 | A1* | 12/2006 | Guleryuz ............. H04N 19/172 375/E7.133 |
| 2007/0053439 | A1* | 3/2007 | Chen .................... H04N 19/433 375/E7.102 |

(Continued)

FOREIGN PATENT DOCUMENTS

| KR | 100335434 B1 | 6/2002 |
| KR | 1020050033098 A | 4/2005 |

(Continued)

*Primary Examiner* — Leron Beck
(74) *Attorney, Agent, or Firm* — Muir Patent Law, PLLC

(57) ABSTRACT

A video encoding method of estimating a motion vector of a current block in a current frame includes identifying a reference block in a reference frame, a first location of the current block within the current frame corresponding to a second location of the reference block within the reference frame, setting a search range in the reference frame, searching for candidate blocks from the search range of the reference frame, each of the candidate blocks satisfying a corresponding first motion estimation criterion of first motion estimation criteria, searching for a prediction block from among the candidate blocks, the prediction block satisfying a second motion estimation criterion, estimating, as the motion vector of the current block, a motion vector corresponding to a displacement between the reference block and the prediction block, and encoding the current block based on the estimated motion vector.

14 Claims, 12 Drawing Sheets

(56) References Cited

U.S. PATENT DOCUMENTS

| | | | | |
|---|---|---|---|---|
| 2007/0071105 A1* | 3/2007 | Tian | H04N 19/109 | 375/E7.149 |
| 2008/0095237 A1* | 4/2008 | Hussain | H04N 19/523 | 375/240.16 |
| 2008/0181308 A1* | 7/2008 | Wang | H04N 19/156 | 375/E7.125 |
| 2008/0240240 A1* | 10/2008 | Kodama | H04N 19/567 | 375/240.14 |
| 2009/0086816 A1* | 4/2009 | Leontaris | H04N 19/80 | 375/E7.193 |
| 2010/0195723 A1* | 8/2010 | Ikai | H04N 19/61 | 375/E7.243 |
| 2011/0164677 A1* | 7/2011 | Lu | H04N 19/147 | 375/E7.126 |
| 2011/0255603 A1* | 10/2011 | Dencher | H04N 19/176 | 375/E7.243 |
| 2012/0327998 A1* | 12/2012 | Nilsson | H04N 19/166 | 375/E7.126 |
| 2013/0022119 A1* | 1/2013 | Chien | H04N 19/51 | 375/E7.123 |
| 2013/0259134 A1* | 10/2013 | Sato | H04N 19/52 | 375/240.16 |
| 2013/0343459 A1 | 12/2013 | Bici et al. | | |
| 2014/0286433 A1* | 9/2014 | He | H04N 19/53 | 375/240.16 |
| 2015/0189272 A1* | 7/2015 | Peng | H04N 19/119 | 375/240.02 |
| 2016/0142729 A1* | 5/2016 | Wang | H04N 19/52 | 375/240.16 |
| 2017/0310988 A1 | 10/2017 | Lin et al. | | |
| 2018/0376149 A1* | 12/2018 | Zhang | H04N 19/513 | |
| 2019/0124332 A1 | 4/2019 | Lim et al. | | |
| 2019/0149836 A1* | 5/2019 | Moon | H04N 19/136 | 375/240.16 |
| 2019/0281290 A1* | 9/2019 | Lee | H04N 19/119 | |
| 2019/0313115 A1* | 10/2019 | Chao | H04N 19/176 | |
| 2020/0120344 A1 | 4/2020 | Mao et al. | | |
| 2020/0195976 A1* | 6/2020 | Zhao | H04N 19/59 | |
| 2020/0296380 A1* | 9/2020 | Aono | H04N 19/593 | |
| 2020/0374525 A1* | 11/2020 | Gao | H04N 19/177 | |
| 2021/0029366 A1 | 1/2021 | Zhang et al. | | |

FOREIGN PATENT DOCUMENTS

| | | | | |
|---|---|---|---|---|
| KR | 100534207 B1 | 12/2005 | | |
| KR | 100890518 B1 | 3/2009 | | |
| KR | 101486850 B1 | 1/2015 | | |
| KR | 101590493 B1 | 2/2016 | | |
| WO | WO-02076095 A1 * | 9/2002 | | H04N 19/127 |

\* cited by examiner

FIG. 2A
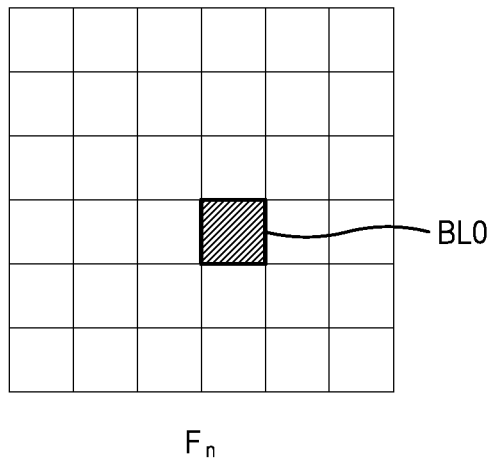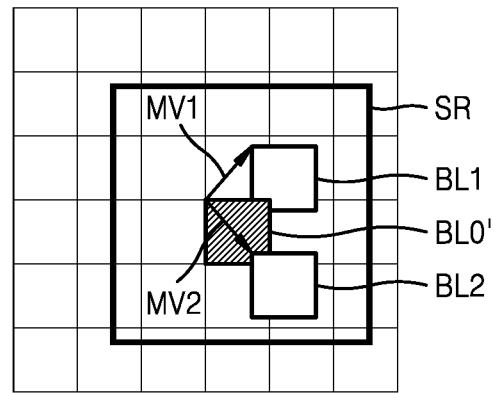
FIG. 2B
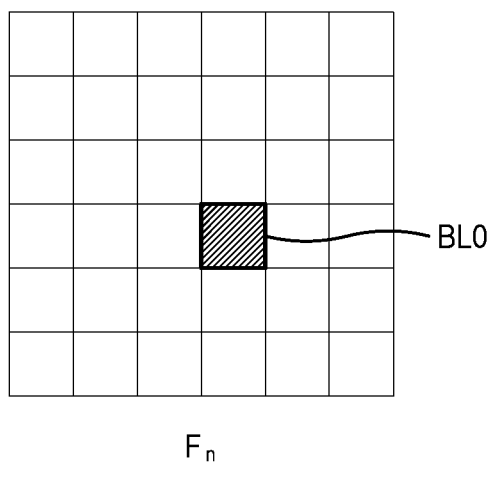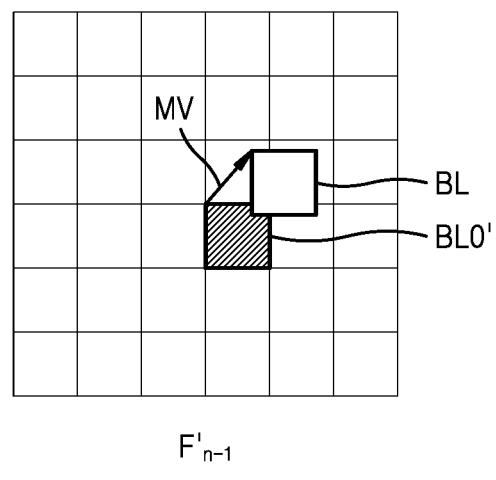

VIDEO ENCODER AND OPERATING METHOD OF THE VIDEO ENCODER

CROSS-REFERENCE TO RELATED APPLICATION

This application is based on and claims priority under 35 U.S.C. § 119 to Korean Patent Application No. 10-2021-0065708, filed on May 21, 2021, in the Korean Intellectual Property Office, the disclosure of which is incorporated by reference herein in its entirety.

BACKGROUND

The inventive concept relates to a video encoder and an operating method of the video encoder, and more particularly, to a video encoder performing motion estimation and an operating method of the video encoder.

As high-definition/high-resolution video data increases, a video encoding method is widely used to compress video data and transmit compressed video data through a communication channel having a limited bandwidth or to store the compressed video data in a recording medium having a limited storage capacity. The video encoding method uses various techniques for effectively compressing video data. A motion estimation technique may effectively reduce the size of video data by removing temporal redundancy between successive frames. Recently, research on a method of improving the performance of motion estimation to improve the quality of a compressed video has been conducted.

SUMMARY

The inventive concept provides a video encoder for estimating a motion vector by applying motion estimation criteria, and an operating method of the video encoder.

According to an aspect of the inventive concept, a video encoding method of estimating a motion vector of a current block in a current frame includes identifying a reference block in a reference frame corresponding to a received original frame, a first location of the current block within the current frame corresponding to a second location of the reference block within the reference frame, setting a search range in the reference frame, searching for a plurality of candidate blocks from the search range of the reference frame, each of the plurality of candidate blocks satisfying a corresponding first motion estimation criterion of a plurality of first motion estimation criteria, searching for a prediction block from among the plurality of candidate blocks, the prediction block satisfying a second motion estimation criterion, estimating, as the motion vector of the current block, a motion vector corresponding to a displacement between the reference block and the prediction block, and encoding the current block based on the estimated motion vector.

According to another aspect of the inventive concept, According to an embodiment of the present invention, a video encoding method includes generating a current frame and a reference frame from a first received original frame and a second received original frame, respectively, each of the current frame and the reference frame being configured in a plurality of layers hierarchically arranged, and the plurality of layers having different resolutions from each other, setting a first search range in a first layer among the plurality of layers of the reference frame, searching for a plurality of candidate motion vectors from among a plurality of candidate blocks in the first search range in the reference frame, each of the plurality of candidate motion vectors satisfying a corresponding first motion estimation criterion of a plurality of first motion estimation criteria, identifying a plurality of blocks in a second layer among the plurality of layer of the reference frame, the plurality of blocks corresponding to the plurality of candidate blocks, respectively, setting a plurality of second search ranges in the second layer, each of the plurality of second search ranges being assigned to a corresponding block of the plurality of blocks in the second layer, searching for a motion vector in the plurality of second search ranges, the motion vector satisfying a second motion estimation criterion, and encoding a current block based on the motion vector.

According to another aspect of the inventive concept, a video encoder includes a candidate motion vector estimation module setting a search range in a reference frame corresponding to a received original frame, and searching for a plurality of candidate motion vectors from a reference block of the reference frame in the search range, each of the plurality of candidate motion vectors satisfying a corresponding first motion estimation criterion of a plurality of first motion estimation criteria, and a motion vector estimation module searching for a motion vector from among the plurality of candidate motion vectors, the motion vector satisfying a second motion estimation criterion. The second motion estimation criterion includes a first function of one of the plurality of first motion estimation criteria, a second function of measuring at least one of a degree of distortion and a bitrate based on a method that is different from each of the plurality of first motion estimation criteria, or a rate-distortion optimization function defined as a combination of the degree of distortion and the bitrate.

BRIEF DESCRIPTION OF THE DRAWINGS

Embodiments of the inventive concept will be more clearly understood from the following detailed description taken in conjunction with the accompanying drawings in which:

FIG. 2A is a schematic diagram illustrating a motion estimation method according to an example embodiment of the inventive concept;

FIG. 2B is a schematic diagram illustrating a motion estimation method according to an example embodiment of the inventive concept;

DETAILED DESCRIPTION OF THE EMBODIMENTS

Hereinafter, embodiments of the inventive concept will be described in detail with reference to the accompanying drawings.

Figure 1:
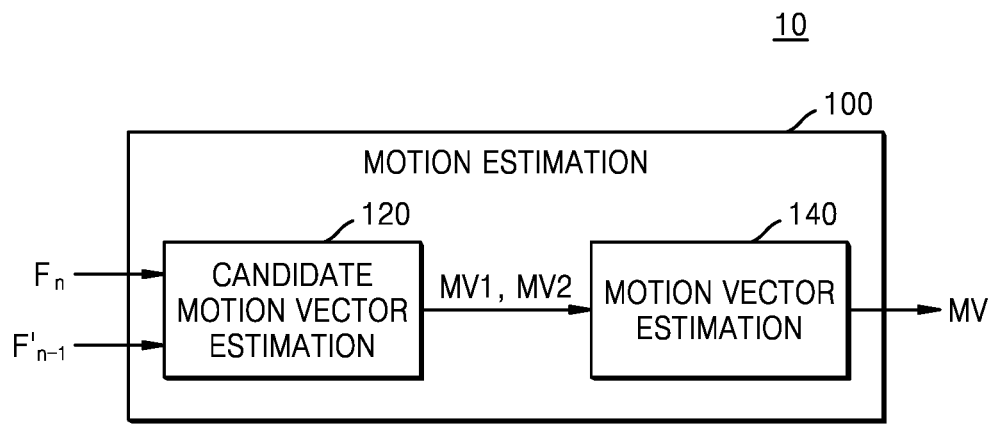
FIG. 1 is a block diagram of a video encoder according to an example embodiment of the inventive concept.

FIG. 1 is a block diagram of a video encoder 10 according to an example embodiment of the inventive concept.

Referring to FIG. 1, the video encoder 10 may encode video data and output a compressed bitstream. The video encoder 10 may comply with various video compression standards. For example, the video encoder 10 may comply with video compression standards such as H.264/Advanced Video Coding (AVC), H.265/High Efficiency Video Coding (HEVC), H.266/Versatile Video Coding (VVC), Moving Picture Experts Group (MPEG)-4, MPEG-H, and MPEG-I.

The video encoder 10 may be included in various devices that process video data. For example, the video encoder 10 may be mounted on a device including a display for outputting video data, for example, a mobile phone, a desktop personal computer (PC), a laptop PC, a tablet PC, or the like. The video encoder 10 may be mounted on a device including a camera module for generating video data, for example, a digital camera, a digital camcorder, or a smartphone. The video encoder 10 may be mounted on a server that performs video encoding to transmit data through a communication channel such as a network. In addition, the video encoder 10 may include one or more semiconductor chips as a component that is included in the devices described above, or may include a computer-readable storage medium for storing software including instructions executed by a Central Processing Unit (CPU) or a Graphics Processing Unit (GPU) to perform video encoding.

The video encoder 10 may receive video data including a plurality of original frames. A current frame $F_n$ may refer to a frame at a current encoding point in time from among received original frames, and a reference frame $F'_{n-1}$ may refer to a frame already decoded/encoded as a frame at a previous encoding point in time. For example, the current frame $F_n$ may be a first original frame, among the plurality of original frames, which is to be encoded, and the reference frame $F'_{n-1}$ may be a second original frame, among the plurality of original frames, which was encoded. A current block may refer to a unit block at a current encoding point in time in the current frame $F_n$, and a reference block may refer to a unit block at a co-located position with the current block in the reference frame $F'_{n-1}$. For example, a location of the current block within the current frame $F_n$ may correspond to a location of the reference block within the reference frame $F'_{n-1}$. The video encoder 10 may include a motion estimation module 100 to increase video compression efficiency. The motion estimation module 100 may perform motion estimation by estimating a prediction block having a high correlation with the current block, which is included in the current frame $F_n$, in the reference frame $F'_{n-1}$. For example, the prediction block may be a block that is within the reference frame $F'_{n-1}$ and has a high correlation with the current block of the current frame $F_n$. The motion estimation module 100 may calculate a predicted motion vector by using a combination of motion vectors of blocks temporally/spatially adjacent to the current block to identify the reference block.

The motion estimation module 100 may divide each of the current frame $F_n$ and the reference frame $F'_{n-1}$ into unit blocks. The unit blocks may be basic units performing motion prediction in the motion estimation module 100. For example, each of the unit blocks may encompass the concept of a MacroBlock (MB) according to the H.264 standard or a Coding Tree Block (CTB) according to the H.265 and H.266 standards. The unit block may have a block size according to a video compression standard or an arbitrary block size. For example, one unit block may include 64×64 pixels, 32×32 pixels, 16×16 pixels, 8×8 pixels, or 4×4 pixels. The size of the unit block may be changed according to a mode in which the video encoder 10 operates.

The motion estimation module 100 may estimate a motion vector of the current block in the current frame $F_n$. The motion estimation module 100 may perform motion prediction by using the reference frame $F'_{n-1}$. The reference frame $F'_{n-1}$ may refer to a pre-encoded frame, and may mean a frame at a previous point in time or a frame at a later point in time than the current frame $F_n$ according to the order of output to a display. The number of reference frames $F'_{n-1}$ is not limited, and the motion estimation module 100 may use a plurality of reference frames $F'_{n-1}$. The video encoder 10 may further include a reference frame storage unit (not shown), and the reference frame storage unit (not shown) may provide the reference frame $F'_{n-1}$ to the motion estimation module 100.

Due to a high correlation between successive frames, the motion estimation module 100 may identify a reference block at a co-located position with the current block in the reference frame $F'_{n-1}$. The reference block is not limited to a block at a spatially co-located position with the current block. In some embodiments, the reference block may be a block at a position adjusted from the current block by a prediction motion vector. In some embodiments, the reference block may be a block at a position adjusted from the current block by any preset value. The motion estimation module 100 may set a certain search range within the reference frame $F'_{n-1}$, based on the reference block at the co-located position of the current block. The motion estimation module 100 may search for a prediction block that most matches the current block within the certain search range, and may estimate a vector corresponding to a displacement between the reference block and the prediction block as a motion vector MV of the current block.

The motion estimation module 100 according to an example embodiment of the inventive concept may include a candidate motion vector estimation module 120 and a motion vector estimation module 140. The motion estimation module 100 may improve the performance of motion estimation by estimating a plurality of candidate motion vectors MV1 and MV2 step by step and estimating the motion vector MV based on the plurality of candidate motion vectors MV1 and MV2. In some embodiments, the motion estimation module 100 may have a plurality of motion estimation layers, estimate the plurality of candidate motion vectors MV1 and MV2 in a higher layer among the plurality of motion estimation layers, and estimate the motion vector MV in a lower layer among the plurality of motion estimation layers.

The motion estimation module 100 may estimate the motion vector MV based on various search algorithms. For example, the motion estimation module 100 may perform a full search to search for all pixels in the reference frame $F'_{n-1}$. In some embodiments, the motion estimation module 100 may search for pixels within a certain region in the reference frame $F'_{n-1}$ based on a region-based search.

The candidate motion vector estimation module 120 may identify a reference block at a co-located position with the current block in the reference frame $F'_{n-1}$ and set a search range based on the reference block at the co-located position. The candidate motion vector estimation module 120 may search for a plurality of candidate motion vectors MV1 and MV2 that satisfy each of the first motion estimation criteria in the search range. For example, the candidate motion vector estimation module 120 may search for a plurality of candidate motion vectors MV1 and MV2 in which a result measured by each of the first motion estimation criteria satisfies a minimum value. In some embodiments, each of the plurality of candidate motion vectors MV1 and MV2 may satisfy a corresponding first motion estimation criterion of the first motion estimation criteria. For example, the candidate motion vector estimation module 120 may search for each of the plurality of candidate motion vectors MV1 and MV2 by optimizing a corresponding first motion estimation criterion of the first motion estimation criteria to have a minimum value.

The motion vector estimation module 140 may estimate the motion vector MV based on the plurality of candidate motion vectors MV1 and MV2. In some embodiments, the motion vector estimation module 140 may estimate, as the motion vector MV, a vector satisfying a second motion estimation criterion among the plurality of candidate motion vectors MV1 and MV2. In some embodiments, the motion vector estimation module 140 may set a certain search range based on the plurality of candidate motion vectors MV1 and MV2 and estimate, as the motion vector MV, a vector satisfying the second motion estimation criterion within the search range.

Blocks illustrated in FIG. 1 and in FIG. 11 described below may include modules that perform certain functions on inputs to produce outputs, or may include specialized or general purpose hardware and/or software configured to form such modules. For example, a block may be a hardware module designed through logic synthesis or the like, or a software module including a series of instructions executed by a processor or the like.

FIGS. 2A and 2B are schematic diagrams illustrating a motion estimation method according to an example embodiment of the inventive concept. Hereinafter, FIGS. 2A and 2B will be described with reference to FIG. 1.

Referring to FIG. 2A, the motion estimation module 100 may divide the current frame $F_n$ and the reference frame $F'_{n-1}$ into unit blocks and search for a prediction block that most matches the current block BL0, which is included in the current frame $F_n$, in the reference frame $F'_{n-1}$. For example, the motion estimation module 100 may divide each of the current frame $F_n$ and the reference frame $F'_{n-1}$ into unit blocks, and may search for a prediction block, from the reference frame $F'_{n-1}$, that most matches the current block BL0 in the current frame $F_n$.

The candidate motion vector estimation module 120 may identify a reference block BL0' of the reference frame $F'_{n-1}$ at a co-located position (i.e., at the same position) with the current block BL0 of the current frame $F_n$, and may set a search range SR based on the reference block BL0' at the co-located position in the reference frame $F'_{n-1}$. The candidate motion vector estimation module 120 may search for a plurality of candidate blocks BL1 and BL2 that satisfy each of the first motion estimation criteria within the search range SR. For example, the first motion estimation criteria may include two motion estimation criteria, and the plurality of candidate blocks BL1 and BL2 may include a first candidate block BL1 and a second candidate block BL2, which satisfy each of the two motion estimation criteria. In some embodiments, the candidate blocks BL1 and BL2 may satisfy two first motion estimation criterion among the first motion estimation criteria, respectively. In some embodiments, each of the candidate blocks BL1 and BL2 may have a corresponding first motion estimation criterion among the first motion estimation criteria within the search range SR. The candidate motion vector estimation module 120 may estimate, as the first candidate motion vector MV1, a vector corresponding to a displacement between the reference block BL0' at the co-located position and the first candidate block BL1 and estimate, as the second candidate motion vector MV2, a vector corresponding to a displacement between the reference block BL0' at the co-located position and the second candidate block BL2. In addition, when the plurality of candidate blocks BL1 and BL2 correspond to the same region or regions adjacent to each other, the candidate motion vector estimation module 120 may select a candidate block (e.g., a third candidate block) that is different from each of the plurality of candidate blocks BL1 and BL2.

Each of the first motion estimation criteria may be a criterion for searching for a prediction block BL that most matches the current block BL0. In some embodiments, each of the first motion estimation criteria may be a criterion for measuring at least one of the degree of distortion of the current block BL0 and a bitrate of the current block BL0. The degree of distortion represents a value obtained by summing pixel value differences (e.g., intensity differences) between a block in the search range SR and the current block BL0. The degree of distortion may be measured based on a single function such as Sum of Absolute Difference (SAD), Sum of Absolute Transformed Difference (SATD), Sum of Squared Difference (SSD), Structural Similarity Index Measure (SSIM), Visual Information Fidelity (VIF), and Detail Loss Metric (DLM). In some embodiments, the degree of distortion may be measured based on a function defined as a combination of different single functions as described above. For example, a degree of distortion D may be measured based on a function in which an SAD single function is combined with an SSIM single function as shown in Equation 1, or may be measured based on a function in which a VIF single function is combined with a DLM single function as shown in Equation 2. 'a' and 'b' in Equation 1 and 'c' and 'd' in Equation 2 may be arbitrary constants.

$$D=a*SAD+b*SSIM \quad \text{[Equation 1]}$$

$$D=c*VIF+d*DLM \quad \text{[Equation 2]}$$

In some embodiments, at least one of the first motion estimation criteria may be a function of measuring a rate of bits (i.e., a bitrate) used to encode the current block BL0 from among bitstream output from the video encoder 10. For example, the bitrate may be one of a bitrate required for encoding a motion vector corresponding to a displacement between a block in the search range SR and the current block BL0, a bitrate required for encoding a pixel value difference between a block in the search range SR and the current block BL0, and a bitrate required for encoding header information. In some embodiments, the bitrate may be a combination of the different bitrates as described above. For example, a bitrate R may be defined as a bitrate R in which a bitrate $R_{mv}$ of a motion vector is combined with a bitrate $R_{res}$ of a difference value as shown in Equation 3 below. In Equation 3, 'e' and 'f' may be arbitrary constants. For example, the bitrate $R_{mv}$ of a motion vector may refer to the amount of data required to encode the current frame $F_n$ using the motion vector, and the bitrate $R_{res}$ of a difference value may refer to the amount of data required to encode the current frame $F_n$ using the difference value between an actual motion vector of the current block BL0 and the estimated motion vector MV in the reference frame.

$$R=e*Rmv+f*Rres \quad \text{[Equation 3]}$$

In some embodiments, at least one of the first motion estimation criteria may include a Rate-Distortion Optimization (RDO) function defined as a combination of the degree of distortion and a bitrate. In some embodiments, the RDO function may be a cost function for optimization of the amount of distortion (i.e., the degree of distortion), which represent loss of video quality, against the amount of data required to encode a video (i.e., a bitrate). As described below with reference to FIG. 3, the first motion estimation criteria may be RDO functions having different weights.

Referring to FIG. 2B, the motion vector estimation module 140 may search for a prediction block BL, among from the plurality of candidate blocks BL1 and BL2, that satisfies a second motion estimation criterion. The motion vector estimation module 140 may estimate, as a motion vector of the current block BL0, a motion vector MV corresponding to a displacement between the reference block BL0' at the co-located position with the current block BL0 and the prediction block BL.

Figure 3:
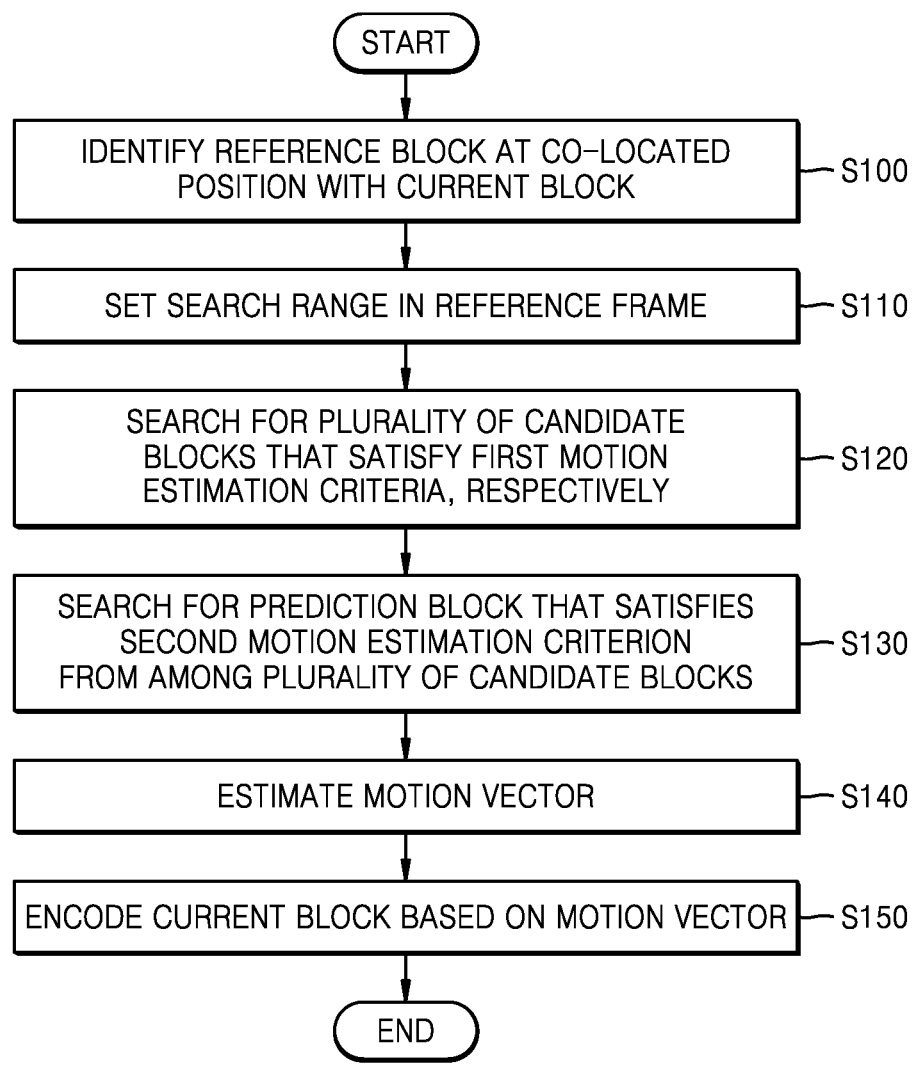
FIG. 3 is a flowchart illustrating a motion estimation method according to an example embodiment of the inventive concept.

FIG. 3 is a flowchart illustrating a motion estimation method according to an example embodiment of the inventive concept. Hereinafter, FIG. 3 will be described with reference to FIG. 1.

Referring to FIG. 3, operations S100 to S150 may represent a flowchart for estimating the motion vector of a current block in the current frame $F_n$.

In operation S100, the candidate motion vector estimation module 120 may identify a reference block at a co-located position with the current block. Due to a high correlation between successive frames, the reference block at the co-located position with the current block may be in the reference frame $F'_{n-1}$. The candidate motion vector estimation module 120 may identify a block at a spatially co-located position with the current block as a reference block. The term of "a spatially co-located position" or "a co-located position" means that when the current frame $F_n$ and the reference frame $F'_{n-1}$ overlap each other, the current block and the reference block are at the same position (i.e., overlap each other). In some embodiments, the candidate motion vector estimation module 120 may identify a block at a position adjusted from the current block by a prediction motion vector as a reference block. In some embodiments, the candidate motion vector estimation module 120 may identify a block at a position adjusted from the current block by an arbitrary predefined value as a reference block.

In operation S110, the candidate motion vector estimation module 120 may set a search range in the reference frame $F'_{n-1}$. The candidate motion vector estimation module 120 may search for a block that most matches the current block in the search range. For example, the search range may be a region centered on the reference block identified in operation S100 or the entire region of the reference frame $F'_{n-1}$.

In operation S120, the candidate motion vector estimation module 120 may search for a plurality of candidate blocks that satisfy each of the first motion estimation criteria in the search range. In some embodiments, the candidate motion vector estimation module 120 may search for blocks, which have a minimum result value measured by each of the first motion estimation criteria, as the plurality of candidate blocks. In some embodiments, the candidate motion vector estimation module 120 may search for the plurality of candidate blocks that satisfy the first motion estimation criteria, respectively. Each of the plurality of candidate blocks may have a minimum result value of a corresponding first motion estimation criterion among the first motion estimation criteria.

Each of the first motion estimation criteria may be defined by various combinations of a function of measuring a degree of distortion and/or a function of measuring a bitrate. For example, at least one of the first motion estimation criteria may be an RDO function defined as a combination of a degree of distortion and a bitrate. The RDO function may be expressed as Equation 4 below. D may represent a degree of distortion, and R may represent a bitrate or bit amount. The constant of λ is a Lagrangian multiplier and may represent a weight between the degree of distortion and the bitrate. In some embodiments, the candidate motion vector estimation module 120 may search for candidate blocks having a minimum operation result J by each of the plurality of RDO functions having different Lagrangian multipliers.

$$J=D+\lambda*R \quad \text{[Equation 4]}$$

In operation S130, the motion vector estimation module 140 may search for a prediction block that satisfies a second motion estimation criterion in a second search range, which will be described with reference to FIG. 9. In some embodiments, the second motion estimation criterion may be one of the first motion estimation criteria. In some embodiments, the second motion estimation criterion may be a function of measuring at least one of a degree of distortion and a bitrate based on a method that is different from each of the first motion estimation criteria. In some embodiments, the second motion estimation criterion may be an RDO function defined as a combination of the degree of distortion and the bitrate.

In operation S140, the motion vector estimation module 140 may search for a prediction block that satisfies the second motion estimation criterion from among a plurality of candidate blocks. The motion vector estimation module 140 may estimate, as a motion vector of a current block, a motion vector MV corresponding to a displacement between the reference block at the co-located position in the reference frame $F'_{n-1}$ and the prediction block in the reference frame $F'_{n-1}$.

In operation S150, the video encoder 10 may encode the current block BL0 based on the motion vector MV. For example, the video encoder 10 may improve video compression performance by encoding a difference value between an actual motion vector of the current block BL0 and the estimated motion vector MV.

The motion estimation method according to an example embodiment of the inventive concept may adaptively apply a motion estimation criterion, suitable for a characteristic of a block to be encoded, by estimating a motion vector by applying motion estimation criteria.

Figure 4:
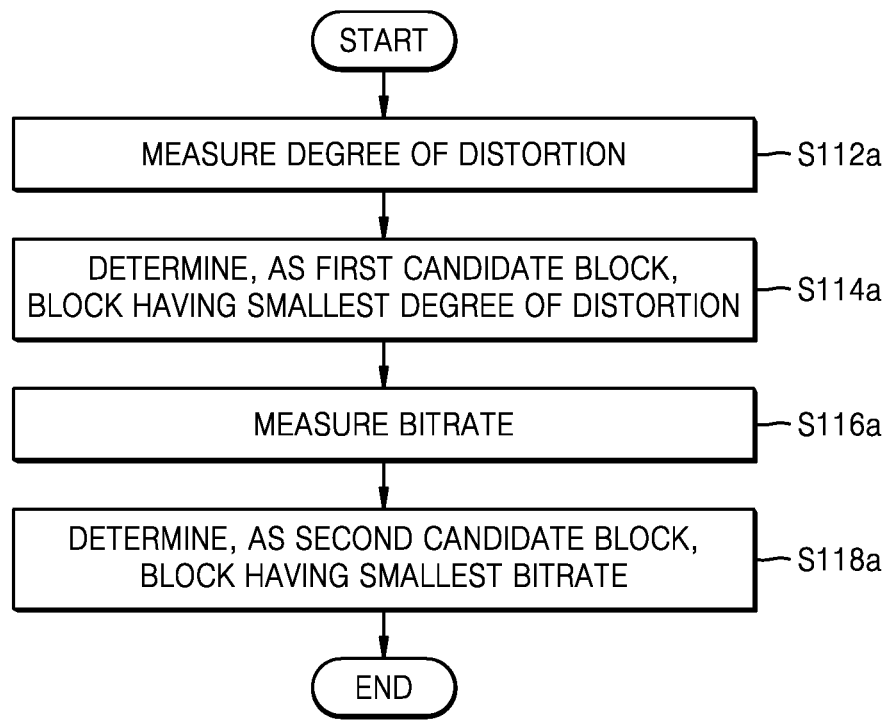
FIG. 4 is a flowchart illustrating a method of searching for a plurality of candidate blocks, according to an example embodiment of the inventive concept.

FIG. 4 is a flowchart illustrating a method of searching for a plurality of candidate blocks, according to an example embodiment of the inventive concept.

Referring to FIG. 4, operations S112a to S118a may be included in operation S120 of FIG. 3. In some embodiments, the method of FIG. 4 may be performed by the candidate motion vector estimation module 120 of FIG. 1. Hereinafter, FIG. 4 will be described with reference to FIG. 1.

In operation S112a, the candidate motion vector estimation module 120 may measure the degree of distortion between each of the blocks in a search range and the current block. The degree of distortion may be calculated by summing pixel value differences between a block included in the search range and the current block. In operation S114a, the candidate motion vector estimation module 120 may determine, as a first candidate block, a block having the smallest measured degree of distortion.

In operation S116a, the candidate motion vector estimation module 120 may measure a bitrate used to encode the current block. In operation Si 18a, the candidate motion vector estimation module 120 may determine, as a second candidate block, a block having the smallest measured bitrate.

Figure 5:
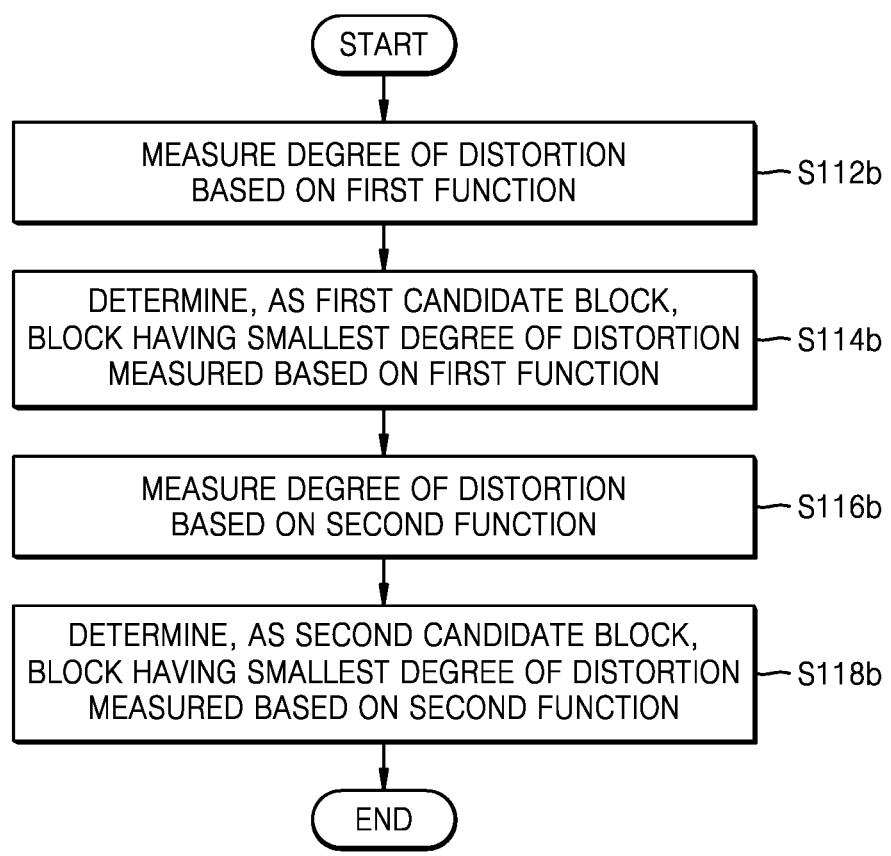
FIG. 5 is a flowchart illustrating a method of searching for a plurality of candidate blocks, according to an example embodiment of the inventive concept.

FIG. 5 is a flowchart illustrating a method of searching for a plurality of candidate blocks, according to an example embodiment of the inventive concept.

Referring to FIG. 5, operations S112b to S118b may be included in operation S120 of FIG. 3. The first motion estimation criteria of FIG. 3 may include a first function and a second function of operations S112b to S118b. In some embodiments, the method of FIG. 5 may be performed by the candidate motion vector estimation module 120 of FIG. 1. Hereinafter, FIG. 5 will be described with reference to FIG. 1.

Referring to FIG. 5, in operation S112b, the candidate motion vector estimation module 120 may measure the degree of distortion between each of the blocks in a search range and the current block, based on the first function. For example, the first function may be one of single functions of measuring the degree of distortion, such as SAD, SATD, SSD, SSIM, VIF, and DLM. In some embodiments, the first function may be a combination of different single functions of measuring the degree of distortion. In operation S114b, the candidate motion vector estimation module 120 may determine, as a first candidate block, a block having the smallest degree of distortion measured based on the first function. The term of "a combination of different single functions" may include a sum of the two functions, a difference of the two functions, a product of the two functions, or a division of one of the two function by another.

In operation S116b, the candidate motion vector estimation module 120 may measure the degree of distortion based on the second function. The second function is a function that is different from the first function. For example, the candidate motion vector estimation module 120 measures the degree of distortion based on the SAD single function in operation S112b, and the candidate motion vector estimation module 120 may measure the degree of distortion based on the SATD single function in operation S112b. In some embodiments, the candidate motion vector estimation module 120 measures the degree of distortion based on a combination of the SAD single function and the SATD single function in operation S112b, and the candidate motion vector estimation module 120 may measure the degree of distortion based on a combination of the SSIM single function and the VIF single function in operation S116b.

In operation S118b, the candidate motion vector estimation module 120 may determine, as a second candidate block, a block having the smallest degree of distortion measured based on the second function. The first candidate block determined in operation S114b and the second candidate block determined in operation S118b may correspond to different regions and may represent blocks having different degrees of distortion.

Figure 6:
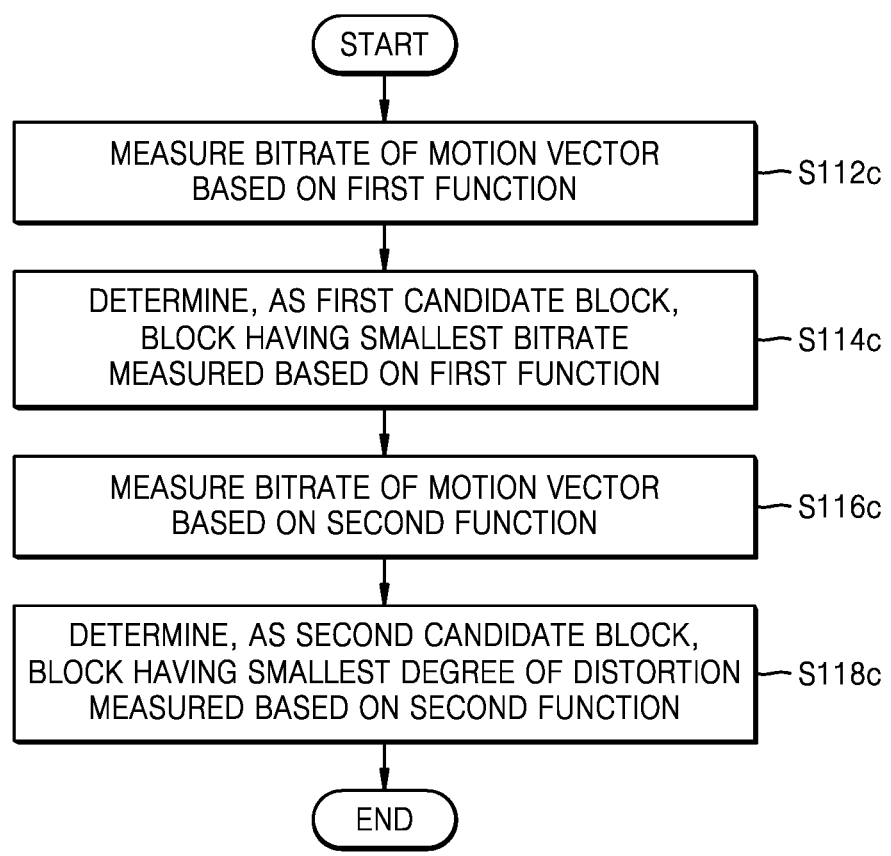
FIG. 6 is a flowchart illustrating a method of searching for a plurality of candidate blocks according to an example embodiment of the inventive concept.

FIG. 6 is a flowchart illustrating a method of searching for a plurality of candidate blocks according to an example embodiment of the inventive concept.

Referring to FIG. 6, operations S112c to S118c may be included in operation S120 of FIG. 3. The first motion estimation criteria of FIG. 3 may include a first function and a second function of operations S112c to S118c. In some embodiments, the method of FIG. 6 may be performed by the candidate motion vector estimation module 120 of FIG. 1. Hereinafter, FIG. 6 will be described with reference to FIG. 1.

Referring to FIG. 6, in operation S112c, the candidate motion vector estimation module 120 may measure a bitrate used to encode a current block based on a first function. In operation S114c, the candidate motion vector estimation module 120 may determine, as a first candidate block, a block having a minimum bitrate measured based on the first function.

In operation S116c, the candidate motion vector estimation module 120 may measure the bitrate of a motion vector based on the second function. The second function is a function that is different from the first function. For example, the candidate motion vector estimation module 120 measures the bitrate of the motion vector based on the first function in operation S112c, and the candidate motion vector estimation module 120 may measure a combination of the bitrate of the motion vector and the bitrate of a difference value based on the second function.

In operation S118c, the candidate motion vector estimation module 120 may determine, as a second candidate block, a block having the smallest degree of distortion measured based on the second function. The first candidate block determined in operation S116c and the second candidate block determined in operation S118c may correspond to different regions and represent blocks having different bitrates.

Figure 7:
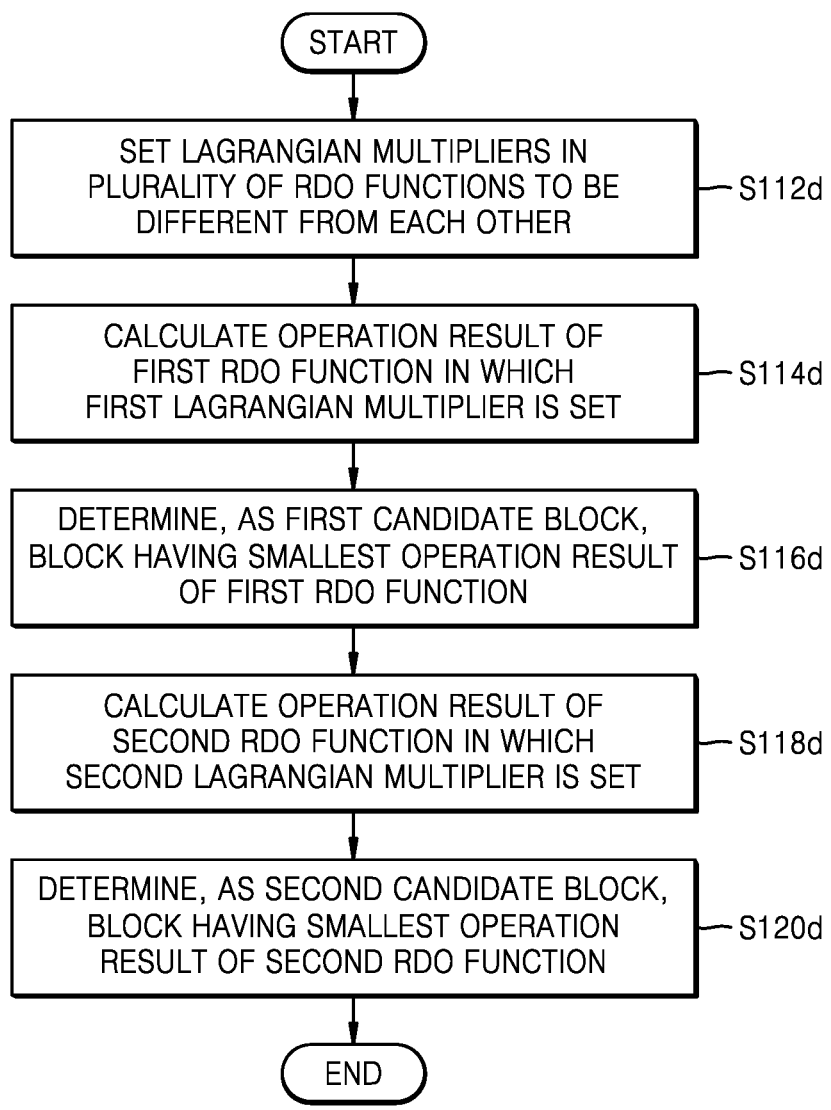
FIG. 7 is a flowchart illustrating a method of searching for a plurality of candidate blocks according to an example embodiment of the inventive concept.

FIG. 7 is a flowchart illustrating a method of searching for a plurality of candidate blocks according to an example embodiment of the inventive concept.

Referring to FIG. 7, operations S112d to S120d may be included in operation S120 of FIG. 3. In some embodiments, the method of FIG. 7 may be performed by the candidate motion vector estimation module 120 of FIG. 1. Hereinafter, FIG. 7 will be described with reference to FIG. 1.

The candidate motion vector estimation module 120 may set Lagrangian multipliers in a plurality of RDO functions to be different from each other. The candidate motion vector estimation module 120 may set a first Lagrangian multiplier in a first RDO function and set a second Lagrangian multiplier, which is different from the first Lagrangian multiplier, in a second RDO function. For example, when the candidate motion vector estimation module 120 intends to set a weight of the degree of distortion to be higher than a weight of the bitrate, the candidate motion vector estimation module 120 may adjust a Lagrangian multiplier to be low. When the candidate motion vector estimation module 120 intends to set a weight of the bit rate to be higher than a weight of the degree of distortion, the candidate motion vector estimation module 120 may adjust the Lagrangian multiplier to be high.

As an embodiment, in operation S112d, the candidate motion vector estimation module 120 may set the first Lagrangian multiplier of the first RDO function and set (i.e., calculate) a difference value between the first Lagrangian multiplier and the second Lagrangian multiplier. The candidate motion vector estimation module 120 may set the second Lagrangian multiplier based on the difference value.

For example, the second Lagrangian multiplier may be set to a value obtained by adding the difference value to the first Lagrangian multiplier. The candidate motion vector estimation module 120 may change a weight difference between the first RDO function and the second RDO function by adjusting a difference between the first Lagrangian multiplier and the second Lagrangian multiplier.

In operation S114d, the candidate motion vector estimation module 120 may calculate an operation result of the first RDO function in which the first Lagrangian multiplier is set in each of the blocks in a search range. In operation S116d, a block having the smallest operation result of the first RDO function may be determined as a first candidate block.

In operation S118d, the candidate motion vector estimation module 120 may calculate an operation result of the second RDO function in which the second Lagrangian multiplier is set in each of the blocks in the search range. The second Lagrangian multiplier may be different from the first Lagrangian multiplier. For example, the first Lagrangian multiplier may have a higher value than the second Lagrangian multiplier.

In operation S120d, a block having the smallest operation result of the second RDO function may be determined as a second candidate block. The first candidate block determined in operation S116d and the second candidate block determined in operation S120d may correspond to different regions.

Figure 8:
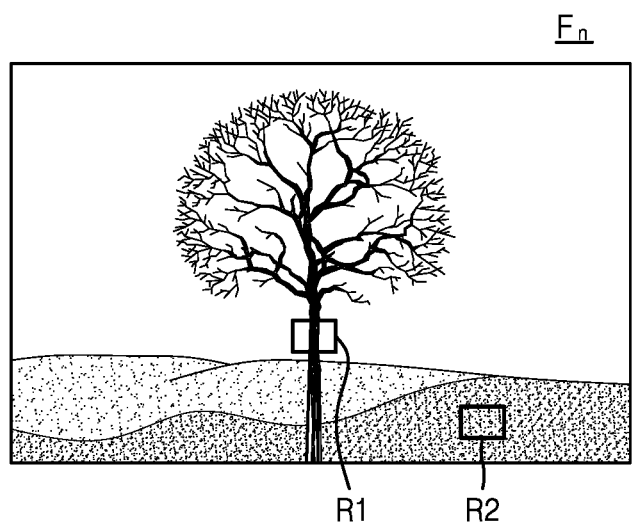
FIG. 8 is a diagram illustrating characteristics of a block according to an example embodiment of the inventive concept.

FIG. 8 is a diagram illustrating characteristics of a block according to an example embodiment of the inventive concept. Hereinafter, FIG. 8 will be described with reference to FIG. 1.

Referring to FIG. 8, the current frame $F_n$ may include a first region R1 and a second region R2 respectively corresponding to different characteristics. The first region R1 and the second region R2 may include a plurality of unit blocks. When the current block is included in the first region R1, the current block may have a large difference in pixel values from adjacent blocks. The motion estimation module 100 may improve the rate-distortion performance of motion estimation by estimating a motion vector having the smallest degree of distortion in the reference frame $F'_{n-1}$. When the current block is included in the second region R2, the current block may have a small difference in pixel values from adjacent blocks. The motion estimation module 100 may increase the rate-distortion performance of motion estimation by estimating a motion vector having a minimum bitrate in the reference frame $F'_{n-1}$.

In some embodiments, the candidate motion vector estimation module 120 may search for a plurality of candidate motion vectors MV1 and MV2 respectively corresponding to the first region R1 and the second region R2. Accordingly, even when the characteristics of the current block are changed, the plurality of candidate motion vectors MV1 and MV2 reflect different video characteristics, and thus, the performance of motion vector estimation may be improved.

Figure 9:
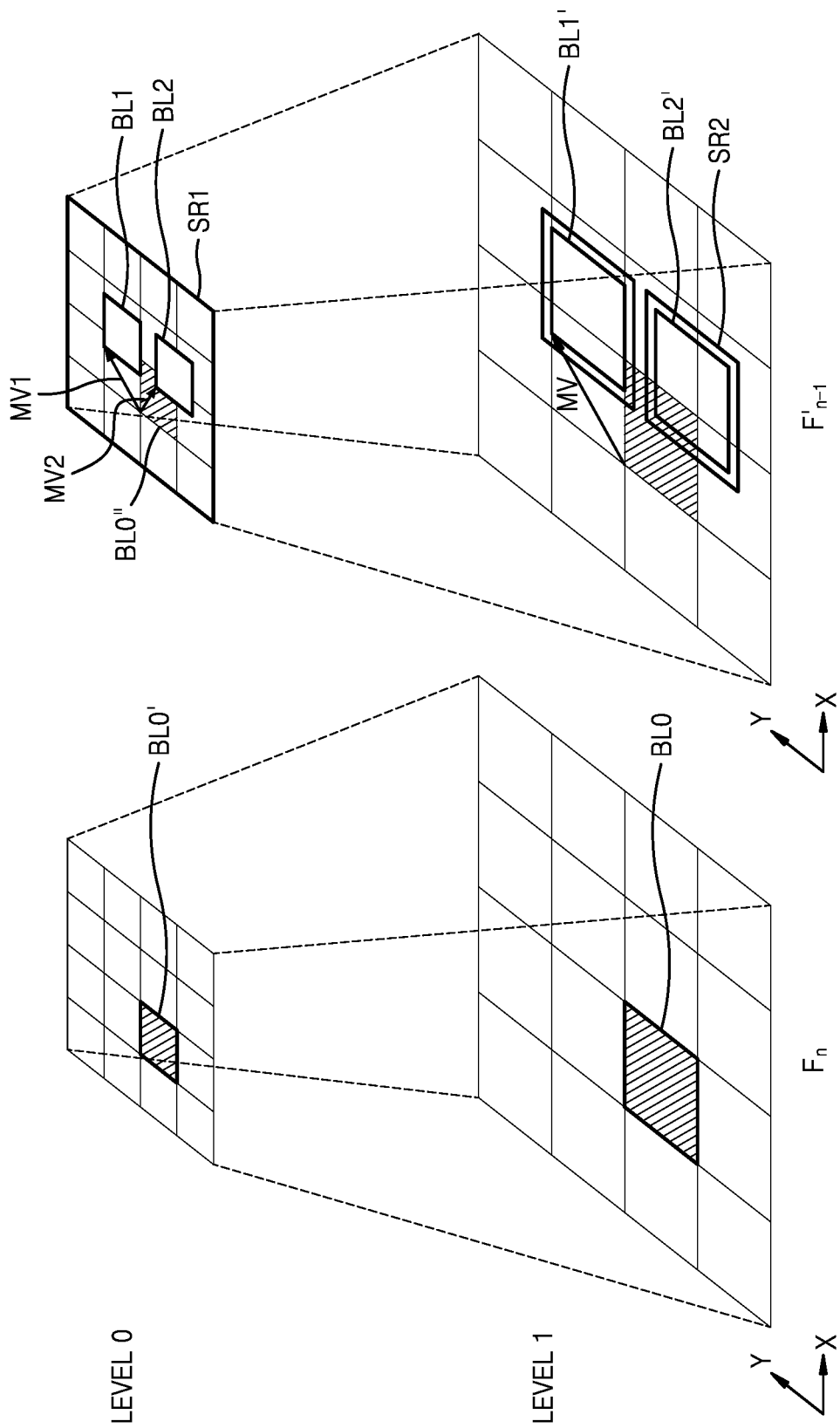
FIG. 9 is a schematic diagram illustrating a motion estimation method according to an example embodiment of the inventive concept.

FIG. 9 is a schematic diagram illustrating a motion estimation method according to an example embodiment of the inventive concept. Hereinafter, FIG. 9 will be described with reference to FIG. 1.

Referring to FIG. 9, the motion estimation module 100 may form a received original frame in a hierarchical structure. In some embodiments, the motion estimation module 100 may receive an original frame and configure the received original frame in the hierarchical structure in which a plurality of motion estimation layers are hierarchically arranged. The motion estimation module 100 may include a plurality of motion estimation layers (hereinafter referred to as layers) respectively corresponding to different resolutions. In some embodiments, the original frame in the hierarchical structure may include the plurality of motion estimation layers with different resolutions. For example, a first layer LEVEL0 may be a layer having a value of ⅛ of an original resolution, and a second layer LEVEL1 may be a layer having the original resolution. Some of the plurality of motion estimation layers (e.g., the first layer LEVEL0) may have different resolutions in a horizontal direction (e.g., an X-axis) and a vertical direction (e.g., a Y-axis). For example, the first layer LEVEL0 may be set to have a value of ½ of the original resolution in the horizontal direction and have a value of ¼ of the original resolution in the vertical direction so that the first layer LEVEL0 has a resolution ⅛ times the original resolution. In some embodiment, The motion estimation module 100 according to an example embodiment of the inventive concept may perform a global search in the reference frame $F'_{n-1}$ of the first layer LEVEL0 to search for a plurality of candidate motion vectors MV1 and MV2, and may perform a region-based search in the reference frame $F'_{n-1}$ of the second layer LEVEL1 to search for a motion vector MV. The motion estimation module 100 may reduce computational complexity while maintaining the performance of motion estimation based on a hierarchical motion estimation method.

In some embodiments, the motion estimation module 100 may receive an original frame and generate a current frame $F_n$ and a reference frame $F_{n-1}$, which correspond to each of the first and second layers LEVEL0 and LEVEL1, from the original frame. In some embodiments, each of the current frame $F_n$ and the reference frame $F'_{n-1}$ may be hierarchically configured into the first and second layers LEVEL0 and LEVEL1. The motion estimation module 100 may generate a low-resolution frame (i.e., the first layer LEVEL0) by performing sub-sampling from the original frame. For example, the motion estimation module 100 may reduce the size of the original frame by ½ in the horizontal direction and by ¼ in the vertical direction by performing sub-sampling (e.g., calculating an average value) on 8 neighboring pixels in the original frame. The second layer LEVEL1 may use the received original frame and may have the same resolution as the original resolution.

The motion estimation module 100 may hierarchically estimate a motion vector of a first current block BL0 in the current frame $F_n$ of the second layer LEVEL1. The candidate motion vector estimation module 120 may identify a second current block BL0' in the current frame $F_n$ of the first layer LEVEL0. The second current block BL0' in the current frame $F_n$ of the first layer LEVEL0 may correspond to the first current block BL0 in the current frame $F_n$ of the second layer LEVEL1. The candidate motion vector estimation module 120 may identify a block BL0" in the reference frame $F'_{n-1}$ of the first layer LEVEL0. The block BL0" may be located at a co-located position with the second current block BL0' in the current frame $F_n$ of the first layer LEVEL0. The candidate motion vector estimation module 120 may set a first search range SR1 based on the block BL0" at the co-located position. The candidate motion vector estimation module 120 may search for a plurality of candidate motion vectors MV1 and MV2 that satisfy the first motion estimation criteria in the first search range SR1. For example, each of the plurality of candidate motion vectors MV1 and MV2 may satisfy a corresponding first motion estimation criterion of the first motion estimation criteria.

The motion vector estimation module 140 may identify a plurality of blocks BL1' and BL2' in the reference frame $F'_{n-1}$ of the second layer LEVEL1 corresponding to the plurality of candidate blocks BL1 and BL2 in the reference frame $F'_{n-1}$ of the first layer LEVEL0, respectively. The motion vector estimation module 140 may set a second search range SR2 based on the plurality of blocks BL1' and BL2' in the reference frame $F''_{n-1}$ of the second layer LEVEL1. The motion vector estimation module 140 may search for a motion vector MV that satisfies a second motion estimation criterion in the second search range SR2, as described with reference to FIG. 2B.

When the plurality of candidate motion vectors MV1 and MV2 searched for in the first layer LEVEL0 designate the same region or regions adjacent to each other, the motion vector estimation module 140 may perform exception handling to improve the performance of the hierarchical motion estimation method. The motion vector estimation module 140 may determine whether the plurality of candidate motion vectors MV1 and MV2 designate the same region or regions adjacent to each other, based on a difference value between the plurality of candidate motion vectors MV1 and MV2 estimated in the first layer LEVEL0. For example, when a difference between an absolute value of the first candidate motion vector MV1 and an absolute value of the second candidate motion vector MV2 is less than a threshold value TH as in Equation 5 below, the motion vector estimation module 140 may determine that the first candidate motion vector MV1 and the second candidate motion vector MV2 designate the same region or regions adjacent to each other.

$$|MV1-MV2|TH \qquad \text{[Equation 5]}$$

The motion vector estimation module 140 may replace any one of the plurality of candidate motion vectors MV1 and MV2 with a new candidate motion vector according to a result of the determination of the first candidate motion vector MV1 and the second candidate motion vector MV2 designating the same region or regions adjacent to each other. The new candidate motion vector may be a predicted motion vector composed of a combination of the plurality of candidate motion vectors MV1 and MV2 and temporal/spatially adjacent blocks. In some embodiments, the new candidate motion vector may be an externally set motion vector. In some embodiments, the new candidate motion vector may be a motion vector estimated according to any manner.

Figure 10:
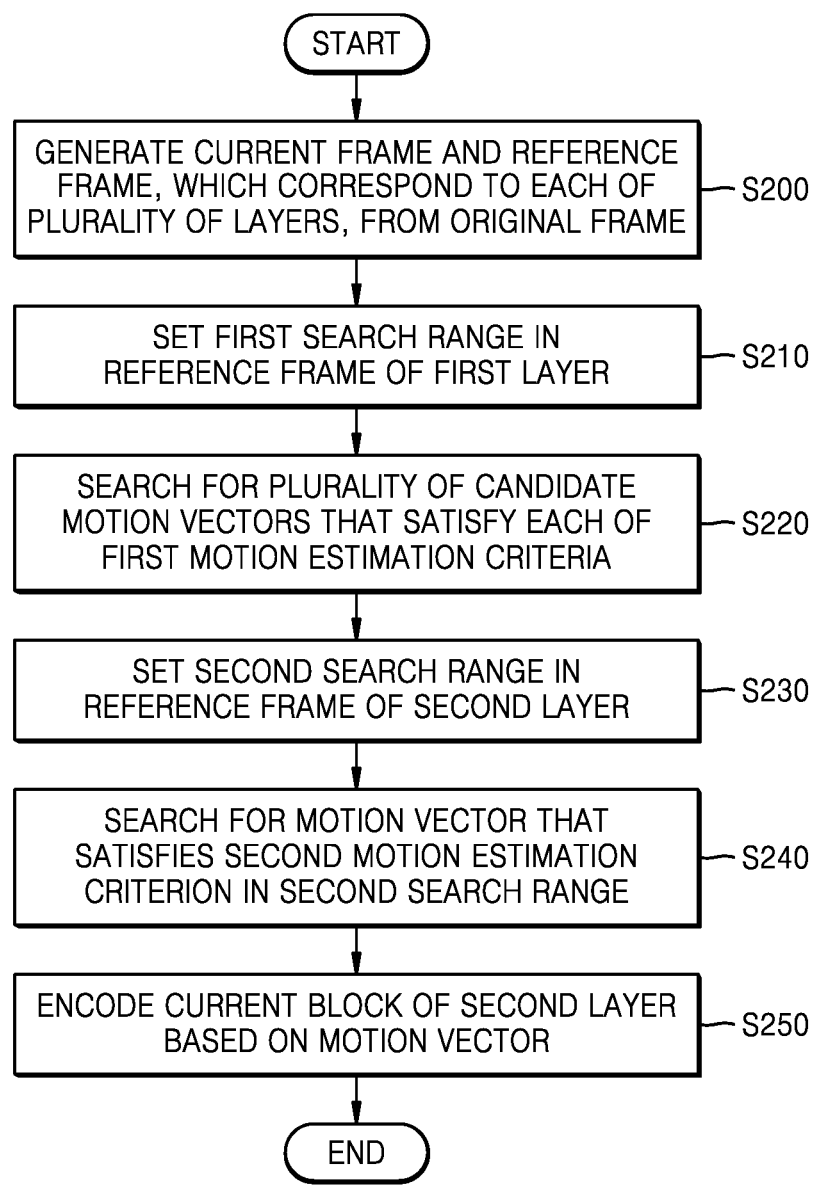
FIG. 10 is a flowchart illustrating a hierarchical motion estimation method according to an example embodiment of the inventive concept.

FIG. 10 is a flowchart illustrating a hierarchical motion estimation method according to an example embodiment of the inventive concept. Hereinafter, FIG. 10 will be described with reference to FIG. 1.

Referring to FIG. 10, operations S200 to S250 may represent a flowchart of estimating a motion vector of a current block in a current frame of a second layer.

In some embodiments, the motion estimation module 100 may include a plurality of motion estimation layers (hereinafter, referred to as layers) having different resolutions. A first layer may be a layer having a first resolution, and a second layer may be a layer having a second resolution. For example, the first layer may be a layer having a resolution that is lower than an original resolution, and the second layer may be a layer having the original resolution. Operations S210 and S220 in FIG. 10 may be performed on the first layer (i.e., the first layer LEVEL0 in FIG. 9), and operations S230 and S240 in FIG. 10 may be performed on the second layer (i.e., the second layer LEVEL1 in FIG. 9).

In operation S200, the candidate motion vector estimation module 120 may generate a current frame and a reference frame, each of which is configured to have the plurality of layers that are hierarchically arranged, from the original frame. For example, the candidate motion vector estimation module 120 may generate the first layer of the current frame and the first layer of the reference frame by reducing the size of the original frame by different ratios in the horizontal and vertical directions. The candidate motion vector estimation module 120 may use the original frame as the second layer of the current frame and the second layer of the reference frame. In some embodiments, the candidate motion vector estimation module 120 may successively receive the original frame, and the original frame to be compressed may be the current frame, and the previous frame may be the reference frame.

In operation S210, the candidate motion vector estimation module 120 may set a first search range (i.e., the first search range SR1 in FIG. 9) in the reference frame of the first layer (i.e., the first layer LEVEL0 in FIG. 9). For example, the first search range may be the entire region of the reference frame of the first layer, and the candidate motion vector estimation module 120 may perform global search on the reference frame of the first layer. However, the first search range is not limited to the entire region of the reference frame, and may encompass a wider region than a second search range (i.e., the second search range SR2 in FIG. 9) set in the reference frame of the second layer.

In operation S220, the candidate motion vector estimation module 120 may estimate a plurality of candidate motion vectors MV1 and MV2 that satisfy each of the first motion estimation criteria in the first search range. In some embodiments, the candidate motion vector estimation module 120 may search for a plurality of candidate motion vectors MV1 and MV2 for which calculation results by each of the first motion estimation criteria are minimum. Each of the first motion estimation criteria may include various combinations of a criterion for measuring the degree of distortion and/or a criterion for measuring a bitrate.

In operation S230, the motion vector estimation module 140 may set the second search range in the reference frame of the second layer (i.e., the second layer LEVEL1 in FIG. 9). The second search range may be a region centered on each of a plurality of blocks of the second layer, which correspond to a plurality of candidate blocks of the first layer searched for in operation S220. The candidate motion vector estimation module 120 may perform a region-based search in the second layer.

In operation S240, the motion vector estimation module 140 may estimate a motion vector MV that satisfies a second motion estimation criterion in the second search range. In some embodiments, the second motion estimation criterion may be any one of the first motion estimation criteria, may be a function of measuring at least one of the degree of distortion and a bit rate based on a method different from each of the first motion estimation criteria, or may be an RDO function defined as a combination of a degree of distortion and a bit rate. The motion vector estimation module 140 may estimate the motion vector MV by performing at least one of a pixel search and a sub-pixel search in the second search range.

In operation S250, the video encoder 10 may encode the current block of the second layer based on the motion vector MV.

Figure 11:
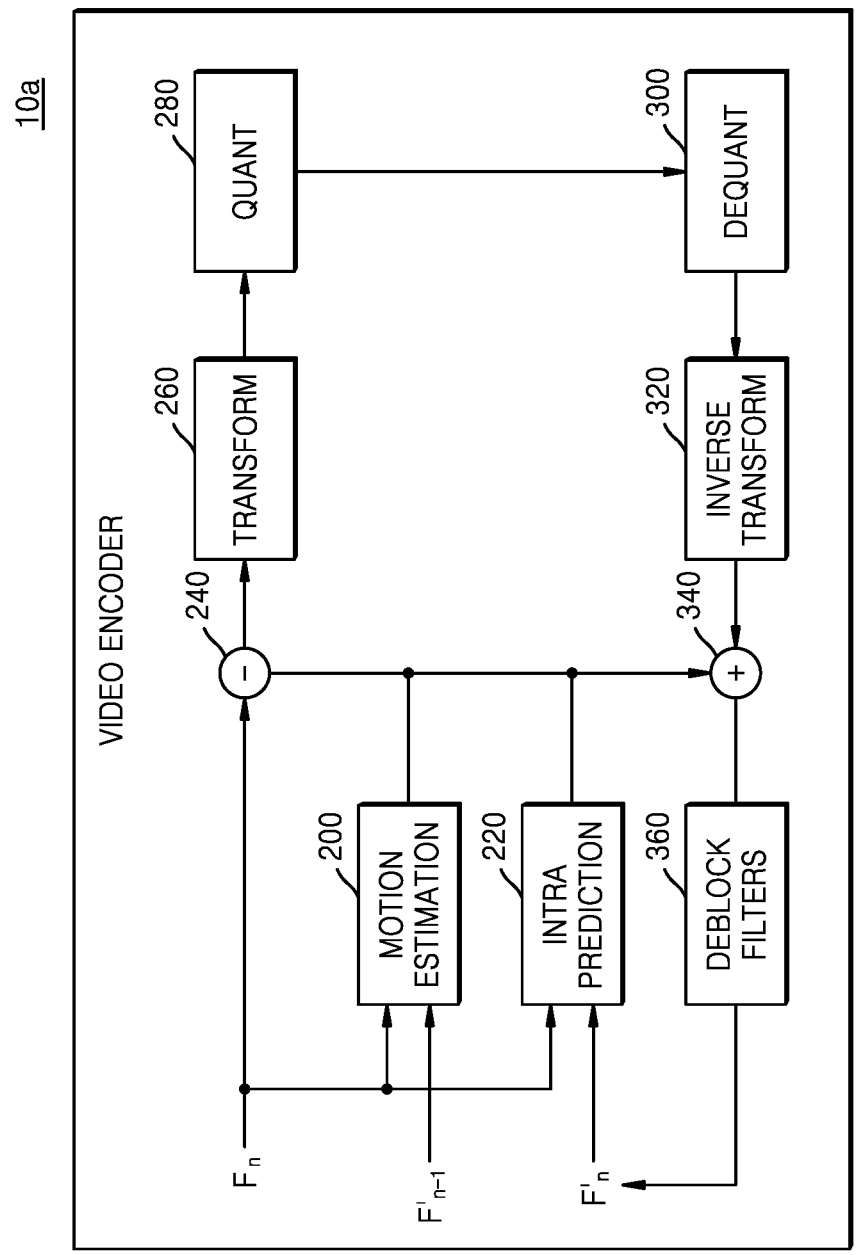
FIG. 11 is a block diagram illustrating a video encoder to which a motion estimation method according to an example embodiment of the inventive concept is applied.

FIG. 11 is a block diagram illustrating a video encoder 10a to which a motion estimation method according to an example embodiment of the inventive concept is applied. Hereinafter, FIG. 10 will be described with reference to FIG. 1.

Referring to FIG. 11, the video encoder 10a may include a motion estimation module 200, an intra prediction module 220, a transform module 260, a quantization module 280, an entropy coding module, a dequantization module 300, an inverse transform module 320, and a deblocking filter module 360. The video encoder 10a may further include a subtractor 240 that performs subtraction of data, and an adder 340 that performs addition of data. The motion estimation module 100 described above with reference to FIGS. 1 to 10 may correspond to the motion estimation module 200 of FIG. 11.

The motion estimation module 200 may search for a prediction block, in the reference frame that most matches a current block of the current frame $F_n$ and may estimate a motion vector of the current block. The motion estimation module 200 according to an example embodiment of the inventive concept may estimate a plurality of candidate motion vectors that satisfy first motion estimation criteria, and may search for a candidate motion vector that satisfies a second motion estimation criterion from among the plurality of candidate motion vectors. Although the motion estimation module 200 is shown to be included in the video encoder 10a as a separate module, the motion estimation module 200 may be included in an inter prediction module (not shown) that performs inter-frame prediction.

The intra prediction module 220 may perform intra-frame estimation and intra-frame prediction on the current block by using pixel values of adjacent blocks in the same frame.

The subtractor 240 may generate residual data between the current block and a prediction block after intra-frame prediction or inter-frame prediction. The transform module 260 may transform spatial domain residual data into frequency domain data. For example, the transform module 260 may generate transform coefficients by performing a discrete cosine transform (DCT) on the residual data.

The quantization module 280 may quantize the transform coefficients generated by the transform module 260. For example, the quantization module 280 may quantize the transform coefficients according to a quantization parameter (QP).

The entropy coding module may losslessly encode the transform coefficients quantized by the quantization module 280 and the motion vector provided by the motion estimation module 200 and output a bitstream. For example, a method such as context-adaptive variable length coding (CAVLC), and context-adaptive binary arithmetic coding (CABAC) may be used.

The dequantization module 300 and the inverse transform module 320 may perform inverse operations of the quantization module 280 and the transform module 260, respectively. For example, the dequantization module 300 may dequantize data output from the quantization module 280, and the inverse transform module 320 may generate spatial domain data by inversely transforming data (i.e., frequency domain data) generated by the dequantization module 300. Data generated by the inverse transform module 320 may be reconstructed residual data.

The deblocking filter module 360 may generate decoded frame data for inter prediction. The deblocking filter module 360 may filter data obtained by adding residual data and prediction data reconstructed by the dequantization module 300 and the inverse transform module 320. Accordingly, as errors of blocks constituting one frame are reduced, frame data representing a more realistic image may be generated. The deblocking filter module 360 may provide the frame data to the intra prediction module 220.

Figure 12:
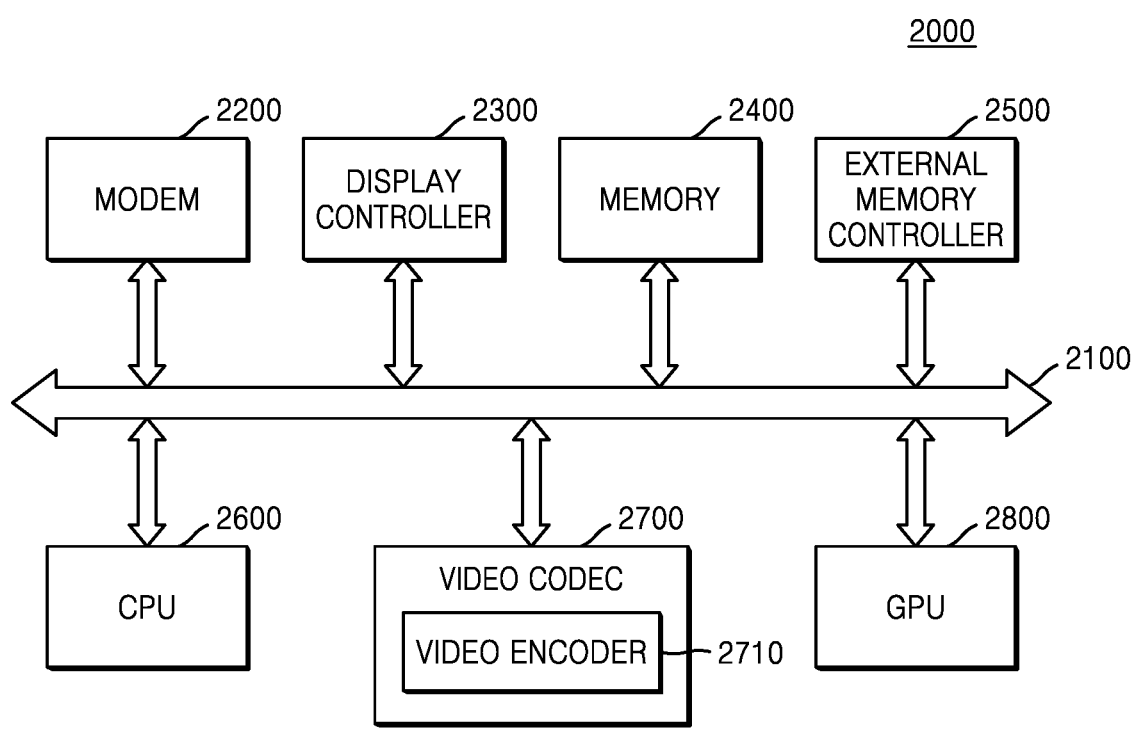
FIG. 12 is a block diagram of an application processor according to an example embodiment of the inventive concept.

FIG. 12 is a block diagram of an application processor 2000 according to an example embodiment of the inventive concept.

Referring to FIG. 12, the application processor 2000 may be implemented as a system on chip (SoC) in which a plurality of processing devices are integrated into one chip. The application processor 2000, which is a semiconductor device, may include a video encoder according to an example embodiment of the inventive concept or perform a video encoding method. The application processor 2000 may perform a video encoding method according to an example embodiment of the inventive concept. The application processor 2000 may include one chip in which complex functional blocks (e.g., intellectual properties (IPs)) performing various functions are implemented, and may generate encoded data, i.e., a bitstream, which provides improved performance, by performing the motion estimation method according to an example embodiment of the inventive concept.

Referring to FIG. 12, the application processor 2000 may include a modem 2200, a display controller 2300, a memory 2400, an external memory controller 2500, a CPU 2600, a video codec 2700, and a GPU 2800, and functional blocks of the application processor 2000 may communicate with one another through a system bus 2100.

The CPU 2600 capable of controlling overall operations of the application processor 2000 may control operations of other functional blocks such as the modem 2200, the display controller 2300, the memory 2400, the external memory controller 2500, the video codec 2700, and the GPU 2800. In an embodiment, the CPU 2600 may perform a video encoding method according to an example embodiment of the inventive concept by executing instructions stored in the memory 2400. For example, the CPU 2600 may generate a bitstream by encoding original data received from the external memory controller 2500, and may transmit the generated bitstream to the modem 2200. In some embodiments, the CPU 2600 may perform motion estimation according to an example embodiment of the inventive concept by executing instructions stored in the memory 2400.

The modem 2200 may demodulate a signal received from the outside of the application processor 2000 or modulate a signal generated inside the application processor 2000 and transmit the modulated signal to the outside. The external memory controller 2500 may control an operation of transmitting data to and receiving data from an external memory device connected to the application processor 2000. For example, programs and/or data stored in the external memory device may be provided to the CPU 2600 or the GPU 2800 under the control of the external memory controller 2500.

The video codec 2700 may encode or decode received video data. The video codec 2700 may include a video decoder (not shown) and/or a video encoder 2710. The video encoder 2710 according to an example embodiment of the inventive concept may estimate a motion vector of a current block by applying motion estimation criteria, and may provide improved image quality at the same compression rate by compressing the current block in an inter-frame encoding mode.

The GPU 2800 may execute program instructions related to graphics processing. The GPU 2800 may receive graphic data through the external memory controller 2500, and may transmit graphic data processed by the GPU 2800 to the outside of the application processor 2000 through the external memory controller 2500. In some embodiments, the GPU 2800 may perform motion estimation according to an example embodiment of the inventive concept by executing instructions stored in the memory 2400.

The memory 2400 may include a non-volatile memory such as Electrically Erasable Programmable Read-Only Memory (EEPROM), flash memory, Phase Change Random Access Memory (PRAM), Resistance Random Access Memory (RRAM), Nano Floating Gate Memory (NFGM), Polymer Random Access Memory (PoRAM), Magnetic Random Access Memory (MRAM), or Ferroelectric Random Access Memory (FRAM), and may include a volatile memory such as Dynamic Random Access Memory (DRAM), Static Random Access Memory (SRAM), mobile DRAM, Double Data Rate Synchronous Dynamic Random Access Memory (DDR SDRAM), Low Power DDR (LPDDR) SDRAM, Graphic DDR (GDDR) SDRAM, or Rambus Dynamic Random Access Memory (RDRAM). The memory 2400 may store the above-described original data or bitstream.

While the inventive concept has been particularly shown and described with reference to embodiments thereof, it will be understood that various changes in form and details may be made therein without departing from the spirit and scope of the following claims.

What is claimed is:

1. A video encoding method of estimating a motion vector of a current block in a current frame, the video encoding method comprising:
   identifying a reference block in a reference frame corresponding to a received original frame, wherein a first location of the current block within the current frame corresponds to a second location of the reference block within the reference frame;
   setting a search range in the reference frame;
   searching for a plurality of candidate blocks from the search range of the reference frame, wherein each of the plurality of candidate blocks is selected based on a different first motion estimation criterion of a plurality of first motion estimation criteria, wherein the plurality of first motion estimation criteria are different from each other;
   searching for a prediction block from among the plurality of candidate blocks, wherein the prediction block satisfies a second motion estimation criterion;
   estimating, as the motion vector of the current block, a motion vector corresponding to a displacement between the reference block and the prediction block; and
   encoding the current block based on the estimated motion vector,
   wherein the searching for the plurality of candidate blocks from the search range of the reference frame includes:
   setting a plurality of Lagrangian multipliers of a plurality of rate-distortion optimization functions, respectively;
   calculating a first operation result according to a first rate-distortion optimization function in which a first Lagrangian multiplier is set in each of a plurality of blocks in the search range;
   determining, as a first candidate block, a first block having a first minimum operation result according to the first rate-distortion optimization function, wherein the first block is in the search range;
   calculating a second operation result according to a second rate-distortion optimization function in which a second Lagrangian multiplier, which is different from the first Lagrangian multiplier, is set to each of the plurality of blocks in the search range; and
   determining, as a second candidate block, a second block having a second minimum operation result according to the second rate-distortion optimization function, wherein the second block is in the search range.

2. The video encoding method of claim 1, wherein each of the plurality of first motion estimation criteria includes a function of measuring at least one of a degree of distortion and a bitrate.

3. The video encoding method of claim 1, wherein at least one of the plurality of first motion estimation criteria includes a single function of measuring a degree of first distortion or a function of a degree of second distortion, wherein the function is defined as a combination of different single functions.

4. The video encoding method of claim 1, wherein the plurality of first motion estimation criteria include a first function and a second function, and wherein the searching for the plurality of candidate blocks includes:
   measuring a plurality of first degree of distortions, each of the plurality of first degree of distortions between a corresponding one of a plurality of blocks in the search range and the current block based on the first function;
   determining, as a first candidate block of the plurality of candidate blocks, a first block in the search range, the first block having a smallest first degree of distortion among the plurality of first degree of distortions measured based on the first function;
   measuring a plurality of second degree of distortions, each of the plurality of second degree of distortions between a corresponding one of the plurality of blocks in the search range and the current block based on the second function that is different from the first function; and
   determining, as a second candidate block of the plurality of candidate blocks, a second block in the search range, the second block having a smallest second degree of distortion among the plurality of second degree of distortions measured based on the second function.

5. The video encoding method of claim 1, wherein at least one of the plurality of first motion estimation criteria includes a function of measuring one of a first bitrate of a motion vector, a second bitrate of a difference value, and a combination of the first bitrate of the motion vector and the second bitrate of the difference value.

6. The video encoding method of claim 1, wherein each of the plurality of first motion estimation criteria includes a first function and a second function, and wherein the searching for the plurality of candidate blocks includes:
   measuring, based on the first function, a first bitrate used to encode the current block;
   determining, as a first candidate block, a first block having a first minimum bitrate measured based on the first function, wherein the first block is in the search range;
   measuring, based on the second function, a second bitrate used to encode the current block, wherein the second function is different from the first function; and
   determining, as a second candidate block, a second block having a second minimum bitrate measured based on the second function, wherein the second block is in the search range.

7. The video encoding method of claim 1, wherein the searching for the plurality of candidate blocks from the search range of the reference frame includes:

measuring a degree of distortion between each of a plurality of blocks in the search range and the current block;

determining a first block having a smallest measured distortion as a first candidate block, wherein the first block is in the search range;

measuring a bitrate used to encode the current block; and determining a second block having a smallest measured bitrate as a second candidate block, wherein the second block is in the search range.

8. The video encoding method of claim 1, wherein at least one of the plurality of first motion estimation criteria includes a rate-distortion optimization function defined as a combination of a degree of distortion and a bitrate.

9. The video encoding method of claim 1, wherein the setting the Lagrangian multipliers includes:

setting the first Lagrangian multiplier of the first rate-distortion optimization function;

calculating a difference value between the first Lagrangian multiplier and the second Lagrangian multiplier; and setting the second Lagrangian multiplier based on the difference value.

10. The video encoding method of claim 1, wherein the searching for the plurality of candidate blocks includes:

determining whether the first candidate block and the second candidate block correspond to the same region or regions adjacent to each other; and determining, in response to the determining that the first candidate block and the second candidate block are at the same region or are adjacent to each other, a third candidate block which is different from each of the first candidate block and the second candidate block.

11. The video encoding method of claim 1, wherein the second motion estimation criterion is one of the plurality of first motion estimation criteria.

12. The video encoding method of claim 1, wherein the second motion estimation criterion includes a first function of measuring at least one of a degree of distortion and a bitrate based on a method that is different from each of the first motion estimation criteria, or a rate-distortion optimization function defined as a combination of the degree of distortion and the bitrate.

13. The video encoding method of claim 1, wherein the second motion estimation criterion is determined based on a pixel value difference between the current block and blocks adjacent to the current block.

14. A video encoder comprising:

a candidate motion vector estimation module configured to:

set a search range in a reference frame corresponding to a received original frame; and search for a plurality of candidate motion vectors from a reference block of the reference frame in the search range, wherein each of the plurality of candidate motion vectors is selected based on a different first motion estimation criterion of a plurality of first motion estimation criteria, and wherein the plurality of first motion estimation criteria are different from each other; and a motion vector estimation module configured to search for a motion vector from among the plurality of candidate motion vectors, wherein the motion vector satisfies a second motion estimation criterion, wherein the second motion estimation criterion includes a first function of one of the plurality of first motion estimation criteria, a second function of measuring at least one of a degree of distortion and a bitrate based on a method that is different from each of the plurality of first motion estimation criteria, or a rate-distortion optimization function defined as a combination of the degree of distortion and the bitrate, and wherein the candidate motion vector estimation module which is configured to search for the plurality of candidate blocks from the search range of the reference is further configured to:

set a plurality of Lagrangian multipliers of a plurality of rate-distortion optimization functions, respectively;

calculate a first operation result according to a first rate-distortion optimization function in which a first Lagrangian multiplier is set in each of a plurality of blocks in the search range;

determine, as a first candidate block, a first block having a first minimum operation result according to the first rate-distortion optimization function, wherein the first block is in the search range;

calculate a second operation result according to a second rate-distortion optimization function in which a second Lagrangian multiplier, which is different from the first Lagrangian multiplier, is set to each of the plurality of blocks in the search range; and determine, as a second candidate block, a second block having a second minimum operation result according to the second rate-distortion optimization function, wherein the second block is in the search range.

* * * * *